United States Patent
Panosyan et al.

(10) Patent No.: US 9,601,918 B2
(45) Date of Patent: *Mar. 21, 2017

(54) SYSTEMS AND METHODS FOR CONTROLLING ACCELERATION OF A POWER GENERATOR

(71) Applicant: General Electric Company, Schenectady, NY (US)

(72) Inventors: Ara Panosyan, Munich (DE); Stefan Schroeder, Munich (DE); Christoph Boeld, Munich (DE); Herbert Schaumberger, Muenster (AT); Johann Hirzinger-Unterrainer, Muenster (AT); Xiaoting Dong, Munich (DE); Uwe Liebscher, Kufstein (AT)

(73) Assignee: General Electric Company, Niskayuna, NY (US)

( * ) Notice: Subject to any disclaimer, the term of this patent is extended or adjusted under 35 U.S.C. 154(b) by 65 days.

This patent is subject to a terminal disclaimer.

(21) Appl. No.: 14/540,536

(22) Filed: Nov. 13, 2014

(65) Prior Publication Data

US 2015/0061298 A1 Mar. 5, 2015

Related U.S. Application Data

(63) Continuation-in-part of application No. 13/536,245, filed on Jun. 28, 2012, now Pat. No. 9,413,217.

(51) Int. Cl.
*B60L 7/00* (2006.01)
*H02H 7/06* (2006.01)
(Continued)

(52) U.S. Cl.
CPC ........... *H02H 7/067* (2013.01); *F03D 7/0244* (2013.01); *F03D 7/0272* (2013.01); *H02J 3/40* (2013.01);
(Continued)

(58) Field of Classification Search
CPC . H02K 49/046; H02P 3/04; H02P 9/06; H02P 9/102; H02P 9/04; F16D 2121/20;
(Continued)

(56) References Cited

U.S. PATENT DOCUMENTS 5,485,901 A 1/1996 Akima et al.
5,685,398 A 11/1997 Marshall et al.
(Continued)

FOREIGN PATENT DOCUMENTS

CN 101432175 A 5/2009
CN 102484448 A 5/2012
(Continued)

OTHER PUBLICATIONS

U.S. Appl. No. 13/536,245, filed Jun. 28, 2012, Panosyan et al.
(Continued)

*Primary Examiner* — Pamela Rodriguez
(74) *Attorney, Agent, or Firm* — Ann M. Agosti

(57) ABSTRACT

An electromagnetic braking system includes an electrically conductive disc coupled to a rotatable shaft of a power generation system for operating in an island mode. The rotatable shaft is operatively coupled between a prime mover and a generator for supplying power to an island grid. The electromagnetic braking system further includes a controller for receiving at least one status or synchronization signal and for generating a control signal based on the at least one signal and an inducting unit for applying an electromagnetic braking force on the electrically conductive disc when commanded by the control signal to regulate a rotational speed of the rotatable shaft.

12 Claims, 3 Drawing Sheets

(51) Int. Cl.
  *H02P 9/10* (2006.01)
  *H02J 3/40* (2006.01)
  *H02J 3/42* (2006.01)
  *H02P 9/04* (2006.01)
  *F03D 7/02* (2006.01)
  *H02P 3/04* (2006.01)
  *H02P 9/06* (2006.01)
  *F16D 121/20* (2012.01)

(52) U.S. Cl.
  CPC .................. *H02J 3/42* (2013.01); *H02P 3/04* (2013.01); *H02P 9/04* (2013.01); *H02P 9/06* (2013.01); *H02P 9/102* (2013.01); *F16D 2121/20* (2013.01); *Y02E 10/723* (2013.01); *Y10T 307/735* (2015.04); *Y10T 477/814* (2015.01)

(58) Field of Classification Search
  CPC ... F03D 7/0244; F03D 7/0272; Y02E 10/723; Y02E 10/725; Y10T 307/735; Y10T 477/814; H02H 7/067; H02J 3/40; H02J 3/42
  USPC ......... 188/161, 159, 160, 162–165; 700/286, 700/288; 322/45, 47, 51, 52, 59, 89
  See application file for complete search history.

(56) References Cited

U.S. PATENT DOCUMENTS

| | | | |
|---|---|---|---|
| 5,821,712 | A | 10/1998 | Fittje |
| 6,149,544 | A | 11/2000 | Masberg et al. |
| 6,253,885 | B1 | 7/2001 | Tsai et al. |
| 6,425,838 | B1 | 7/2002 | Matsubara et al. |
| 6,460,828 | B1 | 10/2002 | Gersemsky et al. |
| 6,619,760 | B1 | 9/2003 | Anwar |
| 6,702,404 | B2 | 3/2004 | Anwar et al. |
| 6,731,034 | B1 | 5/2004 | Habele et al. |
| 7,173,399 | B2 | 2/2007 | Sihler et al. |
| 7,395,888 | B2 | 7/2008 | Yamamoto et al. |
| 7,822,535 | B2 | 10/2010 | Yaguchi |
| 7,944,067 | B2 | 5/2011 | Kammer et al. |
| 7,976,434 | B2 | 7/2011 | Radow et al. |
| 8,021,112 | B2 | 9/2011 | Dinjus et al. |
| 8,265,843 | B2 | 9/2012 | Hornbrook et al. |
| 8,299,735 | B2 | 10/2012 | Horng et al. |
| 8,428,840 | B2 | 4/2013 | O'Dea et al. |
| 8,471,534 | B2 | 6/2013 | Panosyan et al. |
| 8,540,324 | B2 | 9/2013 | Leiber et al. |
| 8,786,997 | B2 | 7/2014 | Maruno et al. |
| 8,994,201 | B2 | 3/2015 | Farley |
| 2002/0170791 | A1 | 11/2002 | Saito et al. |
| 2004/0070269 | A1 | 4/2004 | Anwar et al. |
| 2005/0205712 | A1 | 9/2005 | Aisenbrey |
| 2007/0210584 | A1 | 9/2007 | Stahlhut et al. |
| 2010/0134062 | A1 | 6/2010 | Knoedgen |
| 2010/0241283 | A1 | 9/2010 | Desai et al. |
| 2012/0104754 | A1 | 5/2012 | Rudolf et al. |
| 2012/0201657 | A1 | 8/2012 | Donnelly et al. |
| 2012/0229060 | A1 | 9/2012 | Ritchey et al. |
| 2012/0330522 | A1 | 12/2012 | Gibson et al. |
| 2013/0015026 | A1 | 1/2013 | Li et al. |
| 2013/0306389 | A1 | 11/2013 | Penev |
| 2014/0001756 | A1 | 1/2014 | Panosyan et al. |
| 2014/0015506 | A1 | 1/2014 | Hsiao et al. |
| 2015/0061298 | A1 | 3/2015 | Panosyan et al. |
| 2015/0194913 | A1 | 7/2015 | Hessler et al. |
| 2015/0217660 | A1 | 8/2015 | Manabe et al. |

FOREIGN PATENT DOCUMENTS

| | | |
|---|---|---|
| CN | 102709944 A | 10/2012 |
| CN | 202685972 U | 1/2013 |
| CN | 103089857 A | 5/2013 |
| EP | 2434636 A2 | 3/2012 |
| GB | 444854 A | 3/1936 |
| JP | 50167602 A | 8/1985 |
| JP | 2011190918 A | 9/2011 |
| JP | 2012075209 A | 4/2012 |
| WO | 8808636 A1 | 11/1988 |
| WO | 2009011615 A1 | 1/2009 |

OTHER PUBLICATIONS

U.S. Appl. No. 14/339,552, filed Jul. 24, 2014, Schroeder et al.
U.S. Appl. No. 14/566,145, filed Dec. 10, 2014, Panosyan et al.
US First Action Interview—Office Action issued in connection with related U.S. Appl. No. 14/339,552 on Dec. 21, 2015.
European Search Report and Opinion issued in connection with related EP Application No. 15177889.1 on Jan. 21, 2016.
Adly, et al.,"Speed-Range-Based Optimization of Nonlinear Electromagnetic Braking Systems", Magnetics, IEEE Transactions on, vol. 43, Issue: 6, pp. 2606-2608, ISSN :0018-9464, Jun. 2007.
Jalal,"Simulation and Economic Analysis of a Hybrid Wind Diesel System for Remote Area Power Supply", IMEPE, 2010, Abstract 4 Pages.
Bryanston-Cross et al., "Whole-Field Visualisation and Velocity Measurement of an Instantaneous Transonic Turbine Flow", Instrumentation in Aerospace Simulation Facilities, ICIASF '97 Record., International Congress on, IEEE, Conference Location Pacific Grove, CA, pp. 278-286, 1997.
Qian et al., "Modeling and Control of Electromagnetic Brakes for Enhanced Braking Capabilities for Automated Highway Systems", Intelligent Transportation System, ITSC, IEEE Conference, Conference Location Boston, MA, pp. 391-396, Nov. 9-12, 1997.
Gosline et al., "On the Use of Eddy Current Brakes as Tunable, Fast Turn-On Viscous Dampers for Haptic Rendering", Proc. Eurohaptics, pp. 229-234, 2006.
"Eddy Current & AC DYNO mite Absorbers", Land & Sea, pp. 1-2, Mar. 14, 2009.
Antipova, "The Use of an Electromagnetic Brake to Improve the Dynamic Stability of a Power System", Power Systems and Electric Networks, Power Technology and Engineering, Volume No. 46, Issue No. 1, pp. 75-80, May 2012.
Karakoc, "Modeling and Design Optimization of Electromechanical Brake Actuator Using Eddy Currents", pp. 1-153, 2012.
Non-Final Rejection towards related U.S. Appl. No. 13/536,245 dated Aug. 19, 2014.
Final Rejection towards related U.S. Appl. No. 13/536,245 dated Jan. 22, 2015.
Non-Final Rejection towards related U.S. Appl. No. 13/536,245 dated May 12, 2015.
Office Action issued in connection with related CN Application No. 201310263947.7 on Aug. 26, 2016.

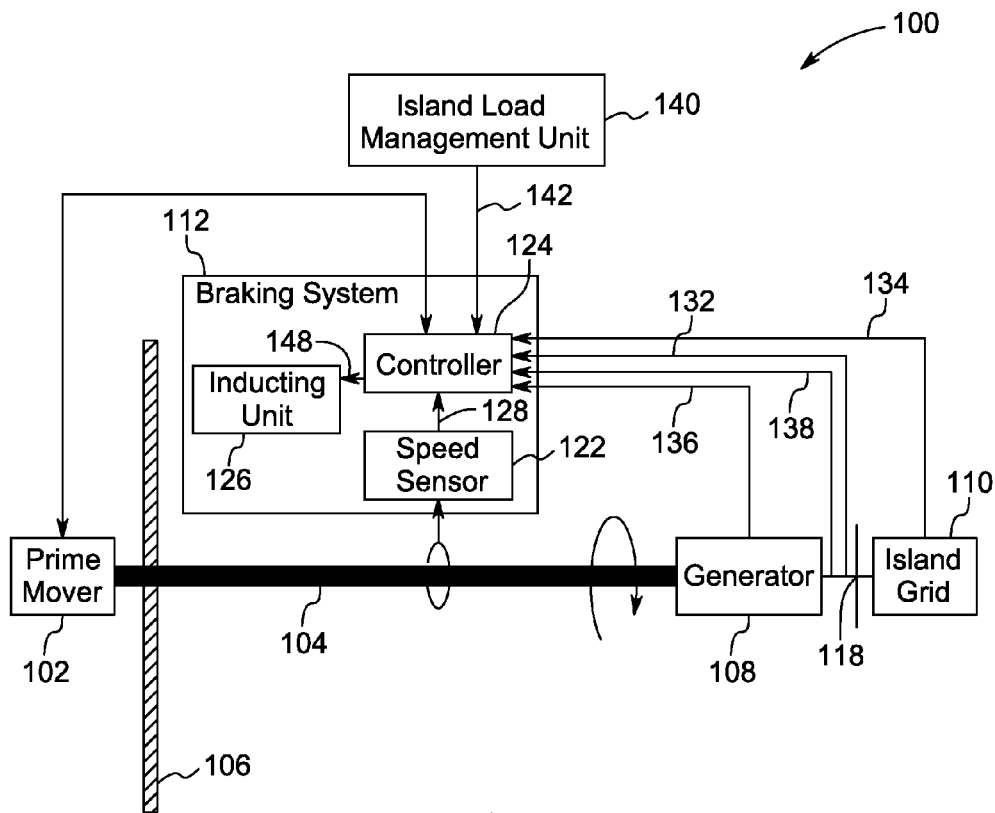

RECEIVE AT LEAST ONE STATUS SIGNAL REPRESENTATIVE OF A ROTATIONAL SPEED OF A ROTATABLE SHAFT OF A POWER GENERATION A CURRENT AT A POWER GENERATOR, A MECHANICAL POWER PRODUCED BY A PRIME MOVER, A ROTOR ANGLE OF THE POWER GENERATOR, AN ELECTRICAL POWER PRODUCED BY THE POWER GENERATOR OR COMBINATIONS THEREOF

DETERMINE A CONTROL SIGNAL BASED ON THE AT LEAST ONE STATUS SIGNAL — 204

206

APPLY AN ELECTROMAGNETIC BRAKING FORCE ON THE ROTATABLE SHAFT WHEN COMMANDED BY THE CONTROL SIGNAL TO REGULATE THE ROTATIONAL SPEED OF THE ROTATABLE SHAFT WITHIN A PREDEFINED TIME PERIOD

FIG. 2

SYSTEMS AND METHODS FOR CONTROLLING ACCELERATION OF A POWER GENERATOR

CROSS REFERENCE TO RELATED APPLICATIONS

This application is a continuation in part of U.S. patent application Ser. No. 13/536,245, entitled "ELECTROMAGNETIC BRAKING SYSTEMS AND METHODS", filed 28 Jun. 2012, which is herein incorporated by reference.

BACKGROUND

The disclosure relates generally to a power generation system and more specifically to systems and methods for controlling acceleration of power generators in the power generation system.

Typically, in island mode or off-grid applications, power generators may be coupled to an island grid that supports one or more customer loads. In one embodiment, these power generators may operate without being parallel coupled to a utility grid. Traditionally, the power generators are limited to diesel generators. However, in recent years, a growth in the use of gas generators for one or more applications has occurred due to tighter emission requirements and improving capabilities of gas engines.

During off-grid operation, a gas engine has generally less transient load acceptance and rejection capability than a diesel engine. Moreover, depending on the type and rating of a gas engine, load rejection may be a challenge. Large load rejections may cause the generators to accelerate and run at over speed, which in turn may lead to tripping the generators. Thus, when large load rejections occur, it is desired to control rapid acceleration of the power generators to avoid tripping the generators.

Various techniques may be employed to overcome the issue of rapid acceleration of power generators in an island-mode or off-grid operation. One proposed solution is to improve the transient capabilities of the power generators through advanced engine control concepts. Although such robust control systems have been developed and implemented, there are still certain limits to the amount of load rejection which small generators can handle only with such advanced controllers.

Another possibility is to increase the inertia of the generator set, for example by adding a flywheel or simply using oversized generators, to reduce the generator acceleration. This however results in additional weight and cost, which may also reduce the dynamic performance of the generators.

Hence, there is a need for an improved system and method for controlling the acceleration and speed of the power generators.

BRIEF DESCRIPTION

In accordance with one embodiment described herein, an electromagnetic braking system includes an electrically conductive disc coupled to a rotatable shaft of a power generation system for operating in an island mode, wherein the rotatable shaft is operatively coupled between a prime mover and a generator for supplying power to an island grid, a controller for receiving at least one status signal from the power generation system and for generating a control signal based on the at least one status signal, and an inducting unit for applying an electromagnetic braking force on the electrically conductive disc when commanded by the control signal to regulate a rotational speed of the rotatable shaft within a predefined time period.

In accordance with a further aspect of the present disclosure, a method includes receiving at least one status signal representative of a rotational speed of a rotatable shaft of a power generation system operating in an island mode, a power load at an island grid, a current at a power generator, a rotor angle of the power generator, an electrical power produced by the power generator, or combinations thereof, determining a control signal based on the at least one status signal, and applying an electromagnetic braking force on the rotatable shaft when commanded by the control signal to regulate the rotational speed of the rotatable shaft within a predefined time period.

In accordance with another aspect of the present disclosure, an electromagnetic braking system includes an electrically conductive disc coupled to a rotatable shaft of a power generation system, wherein the rotatable shaft is operatively coupled between a prime mover and a generator, a controller for receiving at least one synchronization signal from a synchronization unit and for generating a control signal based on the at least one synchronization signal, wherein the at least one synchronization signal represents a difference between a vector voltage of a generator of a power generation system and a vector voltage of a power grid, and an inducting unit for applying an electromagnetic braking force on the electrically conductive disc when commanded by the control signal to regulate a rotational speed of the rotatable shaft.

DRAWINGS

These and other features, aspects, and advantages of the present invention will become better understood when the following detailed description is read with reference to the accompanying drawings in which like characters represent like parts throughout the drawings, wherein:

FIG. 1 is a diagrammatical representation of a power generation system utilizing an electromagnetic braking system, in accordance with aspects of the present disclosure;

FIG. 2 is a flow chart illustrating a method for controlling rapid acceleration of a power generator in the power generation system, in accordance with aspects of the present disclosure;

DETAILED DESCRIPTION

Figure 3:
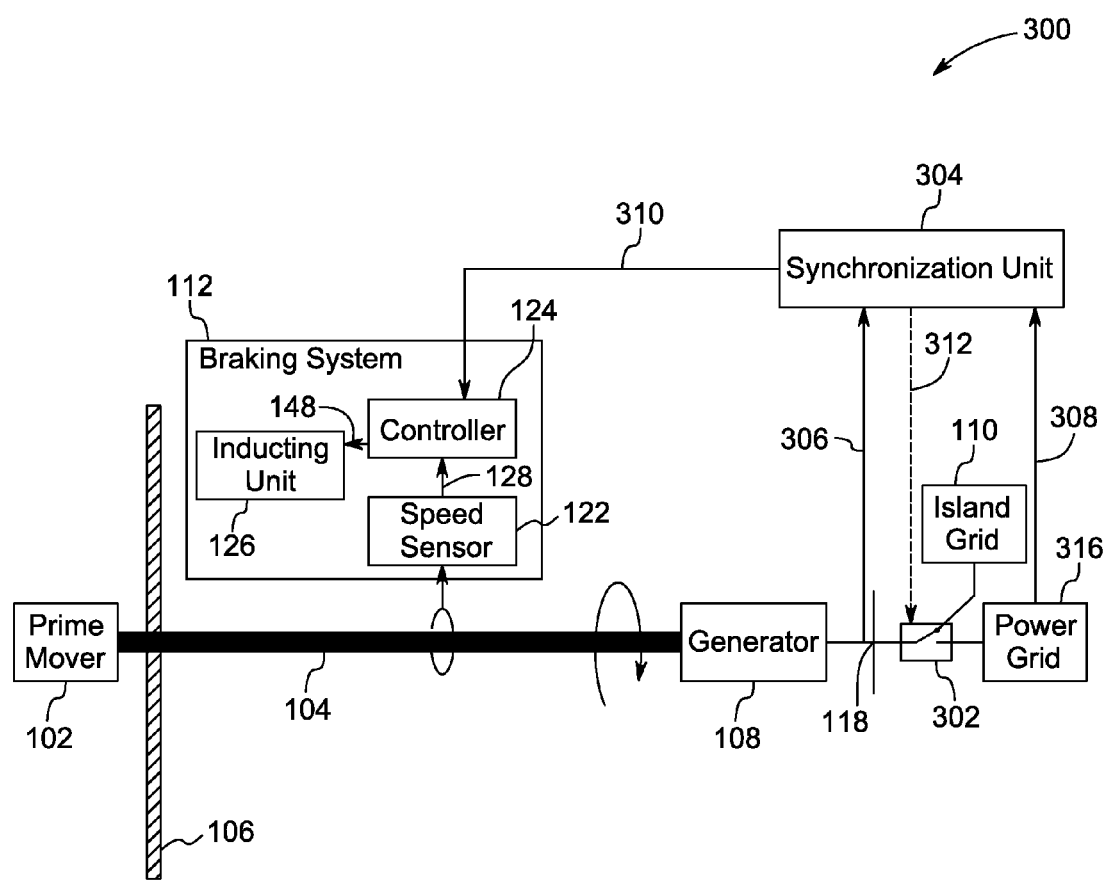
FIG. 3 is a diagrammatical representation of a power generation system utilizing an electromagnetic braking system, in accordance with another embodiment of the present disclosure.

Unless defined otherwise, technical and scientific terms used herein have the same meaning as is commonly understood by one of ordinary skill in the art to which this disclosure belongs. The terms "a" and "an" do not denote a limitation of quantity, but rather denote the presence of at least one of the referenced items. The term "or" is meant to be inclusive and mean one, some, or all of the listed items. The use of "including," "comprising" or "having" and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect. Furthermore, the terms "circuit," "circuitry," "controller," and "processor" may include either a single component or a plurality of components, which are either active and/or passive and are connected or otherwise coupled together to provide the described function.

As will be described in detail hereinafter, various embodiments of an exemplary electromagnetic braking system in a power generation system and methods for controlling rapid acceleration of a power generator in the power generation system are presented. By employing the methods and the various embodiments of the electromagnetic braking system described hereinafter, acceleration of the power generator is controlled at a very low cost.

Referring to FIG. 1, a power generation system 100 having an electromagnetic braking unit 112, in accordance with aspects of the present disclosure, is depicted. The power generation system 100 is typically used to convert mechanical power into electrical power. For example, in a gas engine system, fuel energy of gas combusted in a gas engine is converted into mechanical power. This converted mechanical power is in turn used to generate electrical power. It may be noted that, in the embodiment of FIG. 1, the power generation system 100 is operating in an island mode.

In a presently contemplated configuration, the power generation system 100 includes a prime mover 102, a rotatable shaft 104, an electrically conductive disc 106, a generator 108, and an electromagnetic braking unit 112. The generator 108 provides electrical power to an island grid 110. The island grid 110 may be referred to as a local grid that is used to supply power to one or more customer loads. In one example, the customer loads may include electric pumps, refrigerators, and water heaters. Further, the prime mover 102 may be configured to create mechanical power. The prime mover 102 may comprise, for example, a gas engine, a diesel engine, a wind turbine, or a gas turbine having a rotor (not shown) mechanically coupled to the power generator 108 through the rotatable shaft 104. In one embodiment, the rotatable shaft 104 may include one or more gear boxes (not shown). The rotatable shaft 104 is typically used to convey the mechanical power from the prime mover 102 to the power generator 108. For example, the mechanical power produced at the prime mover 102 may be used to rotate the rotatable shaft 104 at a predetermined speed. This rotation of the rotatable shaft 104 in turn rotates the rotor of the generator 108 to generate electrical power. In one embodiment, the generator 108 may include a three-phase generator.

Furthermore, the generated electrical power at the generator 108 is transferred to the island grid 110. It is to be noted that a connection point 118 of the generator 108 and the island grid 110 is referred to as the point of connection (POC). In some embodiments, the generator 108 may be coupled to the island grid 110 through a power electronic converter (not shown), and in other embodiments the generator 108 may be coupled to the island grid 110 without any power electronic converter. The island grid 110 collects the power generated from one or more generators and transmits the collected power to one or more customer loads, such as electric pumps, refrigerators, and water heaters.

In the exemplary embodiment of FIG. 1, the electrically conductive disc 106 is rigidly coupled to the rotatable shaft 104. The conducing material used for the electrically conductive disc 106 may include, but is not limited to copper, aluminum, and/or steel. When the electrically conductive disc 106 comprises a compact and light disc, there will be only a negligible effect on the inertia of the generator 108. In one exemplary embodiment, the electrically conductive disc 106 may have a thickness of about 1.5 cm and an outer diameter of about 90 cm to provide a torque capability of about 14 kNm under rated current supply. It is to be noted that the material and the dimensions of the electrically conductive disc 106 may vary depending on the type of application and the required braking capability, and thus, they should not be intended as limited to the exemplary ones. Since the electrically conductive disc 106 is rigidly coupled to the rotatable shaft 104, the rotational speed of the rotatable shaft 104 may be controlled by controlling the rotational speed of the electrically conductive disc 106.

During an island mode operation of the power generation system 100, the one or more customer loads may be frequently connected or disconnected from the island grid 110, which in turn causes large power load variation or load rejection at the island grid 110. If the rotational speed of the rotatable shaft 104 is not controlled according to this power load variation or load rejection, the generator 108 may accelerate rapidly and/or run at over speed. This in turn would lead to tripping the generator 108.

To prevent over speed events, in the exemplary embodiment, an electromagnetic braking unit 112 may be used to control the rotational speed of the rotatable shaft 104, which in turn controls the rapid acceleration of the generator 108. As depicted in FIG. 1, the electromagnetic braking unit 112 includes a speed sensor 122, a controller 124, and an inducting unit 126. The controller 124 may be configured to receive one or more status signals from the power generation system 100. In one embodiment, the one or more status signals may include a speed signal 128, a current signal 132, a power load signal 134, a rotor signal 136, and an electrical power signal 138, or a combination thereof. For example, the speed sensor 122 may be coupled to the rotatable shaft 104 to determine the rotational speed of the rotatable shaft 104. Further, the speed sensor 122 may send the speed signal 128 that is indicative of the rotational speed of the rotatable shaft 104 to the controller 124. In one embodiment, the speed signal 128 may be used to obtain information about the torque on the rotatable shaft 104. As other examples, the current signal 132 may represent the current generated at the generator 108, the rotor signal 136 may represent the rotor angle of the generator 108, the electrical power signal 138 may represent the power produced at the generator 108, and the power load signal 134 may represent the power load at the island grid 110.

The controller 124 may determine that the power load at the island grid 110 is below a threshold power value based on the received one or more status signals 128, 132, 134, 136, 138. In one example, the controller 124 may receive the speed signal 128 from the speed sensor 122 that indicates the rotational speed of the rotatable shaft 104. If the rotational speed of the rotatable shaft 104 is above the threshold speed, the controller 124 may determine that the power load at the island grid 110 is below a threshold power value. In another example, the controller 124 may process the power load signal 134 to determine that the power load at the island grid 110 is below the threshold power value. In another example, the controller 124 may receive the current signal 132 and/or the electrical power signal 138 from the generator 108 and may process the current signal 136 and/or the electrical power signal 138 to estimate whether the current at the generator 108 is above a threshold current and/or the voltage at the generator 108 is below a threshold voltage. If so, the controller 124 may determine that the power load at the island grid 110 is below the threshold power value. In yet another example, the controller 124 may receive the rotor signal 136 from the generator 108 that indicates the rotor angle of the generator 108. If the rotor angle is above a threshold rotor angle, the controller 124 may determine that the power load at the island grid 110 is below the threshold power value. Although the above examples use the status signal to estimate power load at the island grid, in other examples, there can be a straight correlation with the status signal and an associated threshold that is used to trigger a braking event without the step of directly estimating power load.

Upon determining that braking is needed, the controller 124 generates the control signal 148 to control the electromagnetic braking force/power on the rotatable shaft 104. In one embodiment, the amount of electromagnetic braking force applied on the rotatable shaft 104 is proportional to the magnitude of the control signal 148. In the exemplary embodiment, the control signal 148 may be generated based on one of these signals 128, 132, 134, 136, 138 or a combination of these signals 128, 132, 134, 136, 138. Thereafter, the controller 124 may send the control signal 148 to drive the inducting unit 126 to control the electromagnetic braking force on the electrically conductive disc 106.

In the embodiment of FIG. 1, the inducting unit 126 is communicatively coupled to the controller 124 to receive the control signal 148 and apply the electromagnetic force based on the control signal 148. Particularly, the inducting unit 126 creates a first magnetic field across the electrically conductive disc 106. In one embodiment, this first magnetic field corresponds to the magnitude of the received control signal 148.

Furthermore, the electrically conductive disc 106 that is coupled to the rotatable shaft 104 rotates through this created first magnetic field. More specifically, the amplitude and/or direction of the first magnetic field may be varied while the electrically conductive disc 106 is rotating along the rotatable shaft 104. As a result of these variations in the first magnetic field that is linked to each portion of the electrically conductive disc 106, eddy currents are induced in the electrically conductive disc 106. These induced eddy currents further create a second magnetic field that is opposing the first magnetic field to resist rotation of the electrically conductive disc 106. By resisting the rotation of the electrically conductive disc 106, the rotational speed of the rotatable shaft 104 may be controlled to be below the threshold speed to avoid rapid acceleration of the power generator 108. In one example, if the rotational speed of the rotatable shaft 104 is above the threshold speed, the rotation of the electrically conductive disc 106 is resisted by the electromagnetic braking system 112 to control acceleration of the power generator 108. Also, while resisting the rotation of the electrically conductive disc 106, the accelerating mechanical power provided to the rotatable shaft 104 of the generator 108 may be dissipated as heat across the electrically conductive disc 106.

Thus, by controlling the electromagnetic braking force, the rotational speed of the rotatable shaft 104 is regulated, which in turn controls the rapid acceleration of the power generator 108 under low load or no load condition at the island grid 110. In the exemplary embodiment, the electromagnetic braking unit 112 helps to regulate the rotational speed of the rotatable shaft 104 within a predefined time period. In one example, the predefined time period may be in a range from about 1 ms to about 10 ms.

In one embodiment, in addition to applying the electromagnetic braking force, the controller 124 may send an engine signal to the prime mover 102 to control the rapid acceleration of the power generator 108. Particularly, the controller 124 may send the engine signal to partially or fully switch OFF an ignition of the prime mover 102 so as to reduce the mechanical power provided to the generator 108. This in turn controls the rapid acceleration of the power generator 108 under low load or no load conditions at the island grid 110. This approach may be referred to as a hybrid solution to control the rapid acceleration of the power generator 108.

In another embodiment, the power generation system 100 may include an island load management unit 140 that is communicatively coupled to the controller 124. Although island load management system 140 is shown as being situated outside the electromagnetic braking unit 112, in some embodiments, the island load management system 140 may be situated within the electromagnetic braking unit 112 either integrated with the controller 124 or as a separate unit.

The island load management unit 140 may send a load-predicted signal 142 to the controller 140. The load-predicted signal 142 includes information related to a new load and a time at which the new load will be added to the island grid 110. In this embodiment, upon receiving the load-predicted signal 142, the controller 124 sends a power-increase signal to the prime mover 102 to increase the mechanical power corresponding to the new load that will be added to the island grid 110. Concurrently, if in a braking scenario, the controller 124 continues to apply the electromagnetic braking force to control the acceleration of the generator 108 until the new load is added to the island grid 110. At the time that is scheduled for adding the load as indicated in the load-predicted signal 142, the new load may be added to the island grid 110 and the controller 124 may release the electromagnetic force so that the increased mechanical power that matches with the new load is provided to the generator 108. This in turn provides an increased electrical power to the island grid 110, resulting in maintaining synchronism between the generator 108 and the island grid 110.

Referring to FIG. 2, a flow chart 200 illustrating a method for controlling rapid acceleration of a power generator in a power generation system, in accordance with one embodiment of the present disclosure, is depicted. For ease of understanding of the present disclosure, the method is described with reference to the components of FIG. 1. The method begins at step 202, where at least one status signal that is representative of a rotational speed of the rotatable shaft 104 of a power generation system operating in an island mode, a power load at an island grid 110, a current at the generator 108, a rotor angle of the generator 108, an electrical power from the generator or combinations thereof, is received from the power generation system 100. To that end, a controller 124 is configured to receive the status signal from the components, such as the prime mover 102, the generator 108, and the island grid 110 of the power generation system 100. Particularly, the controller 124 may receive the status signal that includes at least one of power load signal 134 from the island grid 110, a current signal 132 from the generator 108, a speed signal 128 from the rotatable shaft 104, a rotor signal 136 from the generator 108, and/or a power signal 138 from the generator 108. In the exemplary embodiment, the power load signal 134 may indicate power load required by the island grid 110. The speed signal 128 may indicate the rotational speed of the shaft 104, the current signal 132 may indicate the current generated by the generator 108, the rotor signal 136 may indicate the rotor angle of the generator 108, and the power signal 138 may indicate the electrical power produced by the generator 108.

Additionally, at step 204, a control signal 148 is determined based on one or more of these received status signals 128, 132, 134, 136, 138. In one example, the controller 124 determines whether the rotational speed of the rotatable shaft 104 is above a threshold speed from the received status signal. If so, the controller 124 generates the control signal 148 to initiate braking. In another example, rather than immediately initiating braking, the controller 124 may verify the status signal to detect low load or load rejection at the island grid 110 based on the power load signal 134. If low load or load rejection has occurred in the island grid 110, the controller 124 may determine the control signal 148 corresponding to the power load at the island grid 110. It is to be noted that the controller 124 may generate the control signal 148 based on any combination of the signals 128, 132, 134, 136, 138, and is not limited to the above mentioned examples. Thereafter, the determined control signal 148 is provided to inducting unit 126 that are disposed proximate to an electrically conductive disc 106.

Subsequently, at step 206, an electromagnetic braking force is applied on the rotatable shaft 104 when commanded by the control signal 148 to regulate the rotational speed of the rotatable shaft 104, which in turn helps to control rapid acceleration of the power generator 108. To that end, the inducting unit 126 may apply the electromagnetic braking force on the rotatable shaft 104. Particularly, the inducting unit 126 may create a first magnetic field that is corresponding to the control signal 148 received from the controller 124. This first magnetic field further induces eddy currents in the electrically conductive disc 106 when the electrically conductive disc 106 rotates through the first magnetic field. The induced eddy currents in the electrically conductive disc 106 create a second magnetic field around the electrically conductive disc 106. This created second magnetic field opposes the first magnetic field to resist the rotation of the electrically conductive disc 106. Thus, the electromagnetic braking force is applied on the rotatable shaft 104 via the electrically conductive disc 106 to control rapid acceleration of the power generator 108.

Turning now to FIG. 3, a diagrammatical representation of a power generation system utilizing an electromagnetic braking unit in accordance with another embodiment of the present disclosure is depicted. The generator 108 of the power generation system 300 is coupled to a power grid 316 via a switch gear 302. The switch gear 302 is used for switching the power generation system 300 between an island mode and a power grid mode. In an island mode, the switch gear 302 uncouples the generator 108 from the power grid 316 and couples to the island grid 110. In the power grid mode, the switch gear 302 uncouples the generator 108 from the island grid 110 and couples to the power grid 316. In a no load mode, the switch gear 302 uncouples the generator 108 from both the power grid 316 and the island grid 110.

The power generation system 300 includes a synchronization unit 304 that aids in fast synchronization of the generator 108 and the power grid 316. Although synchronization unit 304 is shown as being situated outside the electromagnetic braking unit 112, in some embodiments, the synchronization unit 304 may be situated within the electromagnetic braking unit 112 either integrated with the controller 124 or as a separate unit.

If in a scenario of switching/coupling the generator 108 to the power grid 316, the synchronization unit 304 is used to synchronize the generator 108 with the power grid 316 before coupling the generator 108 to the power grid 316. Particularly, the synchronization unit 304 receives a first voltage signal 306 from the generator 108 and a second voltage signal 308 from the power grid 316. In one example, the first voltage signal 306 indicates vector voltage of the generator 108, while the second voltage signal 308 indicates vector voltage of the power grid 316 which are compared by the synchronization unit. Further, the synchronization unit 304 determines a synchronization signal 310 that corresponds to a difference between the vector voltage of the generator 108 and the vector voltage of the power grid 316.

The synchronization unit 304 may send the synchronization signal 310 to the controller 124 of the electromagnetic braking unit 112 continuously, periodically, or upon the difference in vector voltages exceeding a threshold. The controller 124 in the electromagnetic braking unit 112 generates a control signal 148 as a function of the received synchronization signal 310. Thereafter, depending on the difference in vector voltages, the controller 124 may send the control signal 148 to the inducting unit 126 to control the electromagnetic braking force/power on the electrically conductive disc 106.

Upon sending a synchronization signal to the controller 124, the synchronization unit 304 may send a switching signal 312 to the switch gear 302 to control the coupling of the generator 108 to the power grid 316. As the synchronization signal is already sent to the controller 124, the vector voltage of the generator 108 is increased or decreased by a corresponding braking force to match with the vector voltage of the power grid 316 before the switch gear 302 couples the generator 108 to the power grid 316. Thus, the time required for synchronizing the generator 108 with the power grid after coupling the generator 108 to the power gird 316 may be substantially minimized or eliminated. In one example, the generator 108 may be synchronized with the power grid 316 within a time period that is in a range from about 1 ms to about 10 ms.

In another scenario of switching/coupling the generator 108 to the island grid 110, the synchronization unit 304 is used to synchronize the generator 108 with the island grid 110 before coupling the generator 108 to the island grid 110. Here again, the synchronization unit 304 receives vector voltages from the island grid 110 and the generator 108, and determines the difference in vector voltages. Thereafter, the synchronization unit 304 along with the controller 124 controls the electromagnetic braking force corresponding to the difference in vector voltages to synchronize the generator 108 with the island grid 110 before the switch gear 302 couples the generator 108 to the island grid 110.

In one embodiment, the generator 108 may not be coupled to any load (no load condition), and the synchronization unit 304 may still synchronize the generator 108 either to the power grid 316 or the island grid 110 depending upon the mode the power generator system 300 may desired to operate.

Figure 4:
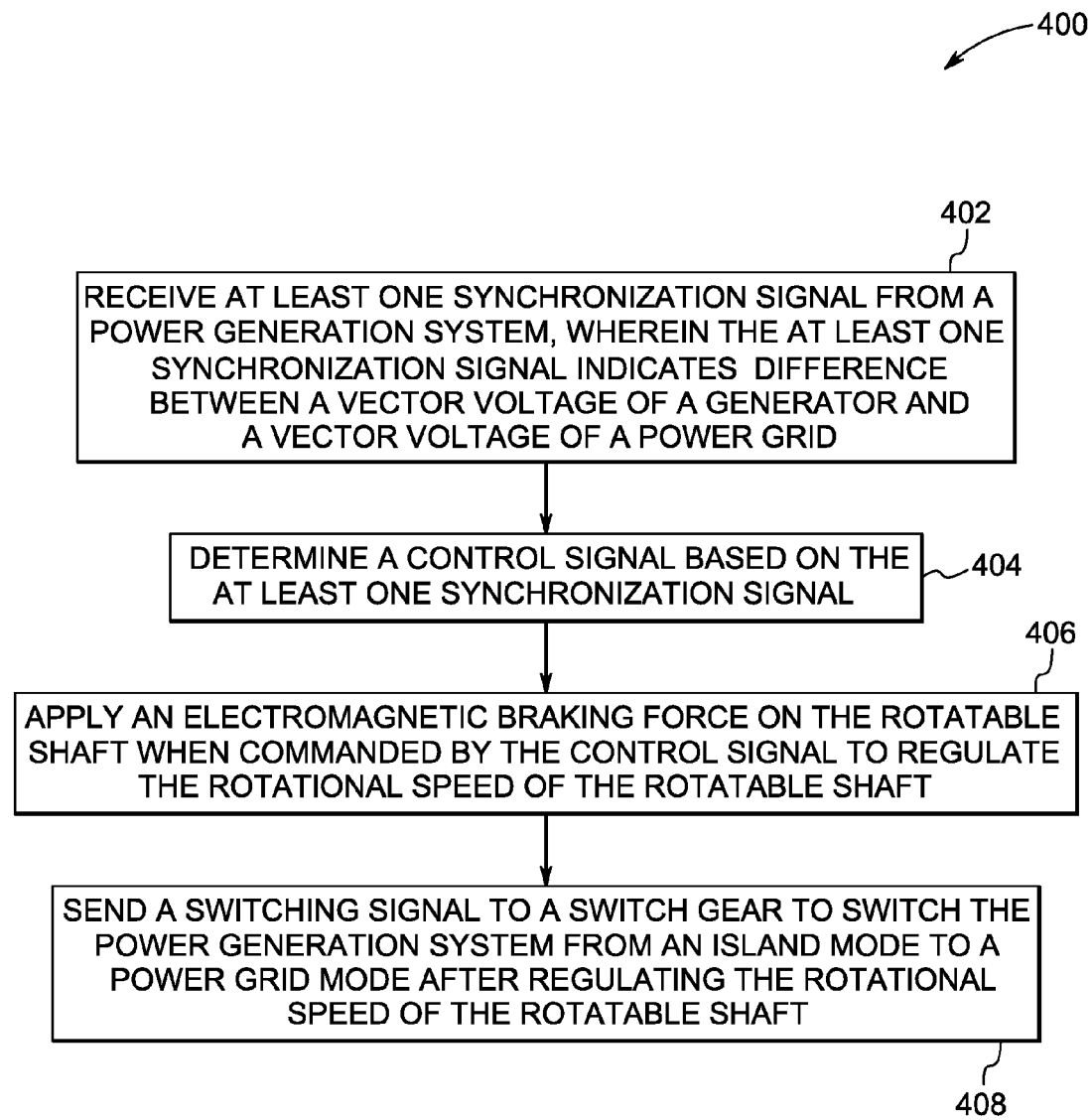
FIG. 4 is a flow chart illustrating a method for synchronizing between a power generator and a power grid in the power generation system, in accordance with aspects of the present disclosure.

Referring to FIG. 4, a flow chart illustrating a method for maintaining synchronism between a power generator and a power grid in the power generation system, in accordance with one embodiment of the present disclosure, is depicted. For ease of understanding of the present disclosure, the method is described with reference to the components of FIG. 3. The method begins at step 402, where a synchronization signal 310 is received from a power generation system 300. To that end, a controller 124 is configured to receive the synchronization signal 310 from the synchronization unit 304. In a scenario of switching/coupling the generator 108 to the power grid 316, the synchronization unit 304 receives a first vector voltage signal 306 from the generator 108 and a second vector voltage signal 308 from the power grid 316 and synchronization unit 304 compares the vector voltage of the generator 108 with the vector voltage of the power grid 316. The synchronization unit 305 determines the synchronization signal 310 that corresponds to a difference between the vector voltage of the generator 108 and the vector voltage of the power grid 316.

Then at step 404 a control signal 148 is determined based on the synchronization signal. To that end, the controller 124 in the electromagnetic braking unit 112 may determine the control signal 148 that corresponds to the received synchronization signal 310. Thereafter, the controller 124 may send the control signal 148 to the inducting unit 126 to control the electromagnetic braking force/power on the electrically conductive disc 106.

In response to the control signal 148, at step 406, depending on the difference in vector voltages, an electromagnetic braking force is applied on the rotatable shaft 104 to regulate the rotational speed of the rotatable shaft 104. To that end, the inducting unit 126 may apply the electromagnetic braking force on the rotatable shaft 104 that is corresponding to the control signal 148 received from the controller 124. Conversely, if more power is required for synchronization, a signal may be sent to prime mover 102 as discussed above with respect to FIGS. 1 and 2.

In addition, at step 408, a switching signal 312 is communicated to a switch gear 302 to switch the power generation system from an island mode to a power grid mode after regulating the rotational speed of the rotatable shaft 104. To that end, a synchronization unit 304 is configured to send the switching signal 312 to the switch gear 302 to couple the generator 108 to the power grid 316. Particularly, if the coupling occurs after the vector voltage of the generator 108 is matched with the vector voltage of the power grid 316, then the synchronization between the generator 108 and the power grid 316 is achieved even before the power generation system 300 is switched from the island mode or no load mode to the power grid mode. In one example, the generator 108 may be synchronized with the power grid 316 within a time period that is in a range from about 1 ms to about 10 ms.

The various embodiments of the system and the method for controlling the speed of the rotating shaft aid in controlling the acceleration or over speed of the generators. This in turn avoids tripping of the generators. Moreover, the power electronics employed in the power generation system may be small in terms of power (e.g. less than 1 kW power needed for 1000 kW braking power) and therewith in terms of size and price. Additionally, a small and light electrically conductive disc may be employed that has almost no effect on the inertia of the generator, and hence, dynamic performance of the generator is maintained.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An electromagnetic braking system comprising:
an electrically conductive disc coupled to a rotatable shaft of a power generation system for operating in an island mode, wherein the rotatable shaft is operatively coupled between a prime mover and a generator for supplying power to an island grid;
a controller for receiving at least one status signal from the power generation system and for generating a control signal based on the at least one status signal;
an inducting unit for applying an electromagnetic braking force on the electrically conductive disc when commanded by the control signal to regulate a rotational speed of the rotatable shaft within a predefined time period; and
an island load management unit for sending a load-predicted signal to the controller for use in generating the control signal, wherein the load-predicted signal includes time and information related to a new load.

2. The electromagnetic braking system of claim 1, wherein the inducting unit is configured to induce eddy currents in the electrically conductive disc when commanded by the control signal.

3. The electromagnetic braking system of claim 1, wherein the at least one status signal comprises at least one signal representative of the rotational speed of the rotatable shaft, power load at the island grid, a current at the generator, a voltage at the generator, a rotor angle of the generator, and an electrical power produced by the generator or combinations thereof.

4. The electromagnetic braking system of claim 3, wherein the controller is configured to cause the control signal to initiate and regulate the electromagnetic braking force when the power load at the island grid is below a threshold power value.

5. The electromagnetic braking system of claim 3, wherein the controller is configured to cause the control signal to initiate and regulate the electromagnetic braking force when the rotational speed of the rotatable shaft is above a threshold speed.

6. The electromagnetic braking system of claim 3, wherein the controller is configured to cause the control signal to initiate and regulate the electromagnetic braking force when at least one of the current at the generator is above a threshold current and the voltage at the generator is below a threshold voltage.

7. The electromagnetic braking system of claim 1, wherein the controller is further configured for sending an engine signal to the prime mover to control mechanical power provided by the prime mover.

8. The electromagnetic braking system of claim 1, wherein the controller sends a power-increase signal to the prime mover to increase mechanical power corresponding to the new load, and wherein the controller releases the electromagnetic braking force on the electrically conductive disc when the new load is added to the island grid.

9. A method comprising:
receiving at least one status signal representative of a rotational speed of a rotatable shaft of a power generation system operating in an island mode, a power load at an island grid, a current at a power generator, a rotor angle of the power generator, an electrical power produced by the power generator or combinations thereof;
determining a control signal based on the at least one status signal;
applying an electromagnetic braking force on an electrically conductive disc when commanded by the control signal to regulate the rotational speed of the rotatable shaft within a predefined time period;
receiving a load-predicted signal from an island load management unit, wherein the load-predicted signal includes time and information related to a new load;

sending a power-increase signal to a prime mover to increase mechanical power corresponding to the information related to the new load; and releasing the electromagnetic braking force on the electrically conductive disc when the new load is added to the island grid.

10. The method of claim 9, wherein applying the electromagnetic braking force on the rotatable shaft comprises:

creating a first magnetic field across the electrically conductive disc coupled to the rotatable shaft;

inducing eddy currents in the electrically conductive disc when the electrically conductive disc rotates through the first magnetic field; and using the induced eddy currents in the electrically conductive disc for creating a second magnetic field opposing the first magnetic field to resist rotation of the electrically conductive disc.

11. The method of claim 9, further comprising:

determining whether the rotational speed of the rotatable shaft is above a threshold speed;

if so, sending the control signal to an inducting unit for applying the electromagnetic braking force on the electrically conductive disc to reduce the rotational speed of the rotatable shaft below the threshold speed.

12. The method of claim 9, further comprising:

determining whether the rotational speed of the rotatable shaft is above a threshold speed;

if so, determining whether the power load at the island grid is below a threshold power value; and then if so, sending the control signal to an inducting unit for applying the electromagnetic braking force on the electrically conductive disc.

* * * * *